United States Patent [19]

Lee

[11] 4,102,142

[45] Jul. 25, 1978

[54] UNDERWATER RISER BUOYANCY

[75] Inventor: George Lee, Monterey Park, Calif.

[73] Assignee: Hitco, Irvine, Calif.

[21] Appl. No.: 755,660

[22] Filed: Dec. 30, 1976

[51] Int. Cl.² .................... E21C 19/00; E21B 43/01
[52] U.S. Cl. ........................................ 61/86; 61/112
[58] Field of Search ............... 61/107, 108, 109, 110, 61/86–104; 175/5–7, 9; 166/0.5, 0.6; 9/8 P, 13; 114/230

[56] References Cited

U.S. PATENT DOCUMENTS

| 2,627,302 | 2/1953 | Forsyth | 5/368 |
| 2,715,231 | 8/1955 | Marston | 9/13 X |
| 3,410,096 | 11/1968 | Schur | 61/54 X |
| 3,572,041 | 3/1971 | Graaf | 175/7 X |
| 3,605,668 | 7/1969 | Morgan | 9/8 P X |
| 3,957,112 | 5/1976 | Knibble et al. | 166/0.5 |
| 3,996,757 | 12/1976 | Liddell | 61/54 |

FOREIGN PATENT DOCUMENTS

| 1,513,811 | 1/1968 | France | 9/8 P |
| 874,178 | 8/1961 | United Kingdom | 175/7 |

*Primary Examiner*—Dennis L. Taylor
*Attorney, Agent, or Firm*—Roylance, Abrams, Berdo & Farley

[57] ABSTRACT

Controlled buoyancy of underwater pipe installations, typically subsea risers, is achieved by securing to the pipe at least two buoyancy members each comprising a plurality of rigid hollow tubular members arranged side-by-side to form a group which is enclosed in a rigid liquid-tight shell. Advantageously, the tubular members have flat sides lying in planes which are radial with respect to the pipe when the buoyancy member is in place, and adjacent pairs of the tubular members are in flush side-wall-to-side-wall contact. Superior results are obtained when the tubular members are pultrusions of polymeric material and the shells are continuous layers of fiber-filled polymeric material.

10 Claims, 5 Drawing Figures

UNDERWATER RISER BUOYANCY

RELATED APPLICATION

This application discloses subject matter described and claimed in my copending application, Ser. No. 755.659. filed concurrently herewith and entitled Method For Making Buoyancy Members, now U.S. Pat. No. 4,057,450.

BACKGROUND OF THE INVENTION

In the drilling and completion of offshore wells, it is common to employ large diameter pipes extending from a point at or near the floor of the ocean or other body of water to the vessel or platform from which operations are carried out. Risers, caissons or "extended casings" are typical. Particularly when the pipe contains drilling mud or other fluid, the great weights involved place the riser or the like under large compression loads, and it is common practice to tension the pipe to compensate for such loads. In early installations, mechanical devices were employed to apply the desired tensioning force. Subsequently, prior-art workers have employed buoyancy devices, either to reduce the load on the mechanical tensioning device or to eliminate the need for that device. The buoyancy devices have taken the form of hollow metal buoyancy chambers, as shown for example in U.S. Pats. No. 3,017,934, issued Jan. 23, 1962, to A. D. Rhodes et al. and 3,933,108, issued Jan. 20, 1976, to B. G. Baugh, or have been formed from "syntactic foam" materials, such as those disclosed in U.S. Pat. No. 3,522,437, issued Nov. 23, 1971, to E. C. Hobaica et al.

The use of buoyancy devices has attained considerable commercial success but still presents substantial disadvantages. The metal chambers are cumbersome, expensive to construct, have the disadvantage that the metal employed adds substantial additional weight, and require careful design and construction to assure that the sealed nature of the chambers will be preserved during use. The syntactic foam materials are also expensive, and they present substantial production difficulties and make it difficult to achieve quality control and attain high resistance to impact. There has accordingly been a continuing need to achieve buoyancy control in such underwater pipe installations as risers and the like with use of metal chambers or syntactic foam.

OBJECTS OF THE INVENTION

A general object of the invention is to provide buoyancy control in underwater pipe systems, of the type typified by subsea risers, without recourse to heavy metal structures or syntactic foam.

Another object is to provide buoyancy devices which achieve buoyancy by using hollow members which are of such nature and size as to allow practical testing and evaluation before being incorporated in the overall structure.

A further object is to devise buoyancy devices of the type described which can be produced from relatively inexpensive materials and components, yet provide improved resistance to impact and have high strengths to withstand the large hydrostatic forces to which they are subjected in use.

SUMMARY OF THE INVENTION

Each length or "joint" of the riser or like pipe is equipped with at least two elongated buoyancy members each comprising a plurality of rigid hollow tubular elements arranged side-by-side to form a group, the group being enclosed within a liquid-tight shell, the inner wall of the buoyancy member being adapted engage the pipe. The buoyancy members are secured to the pipe, as by clamping bands. Advantageously, the tubular elements are polymeric pultrusions and have flat sides which diverge outwardly in such fashion as to constitute like portions of the equal sides of an isosceles triangle, so that in the completed assembly the pultrusions can be in side-to-side flush contact with each pultrision side lying in a plane radial relative to the pipe. The liquid-tight shell can then be in the form of a continuous layer of fiber-filled polymeric material overlying and adhered to the exposed surfaces of the tubular elements.

In order that the manner in which the foregoing and other objects are achieved according to the invention can be understood in detail, particularly advantageous embodiments thereof will be described with reference to the accompanying drawings, which form part of the original disclosure of this application, and wherein.

DETAILED DESCRIPTION OF THE EMBODIMENT OF FIGS. 1-4

Figure 1:
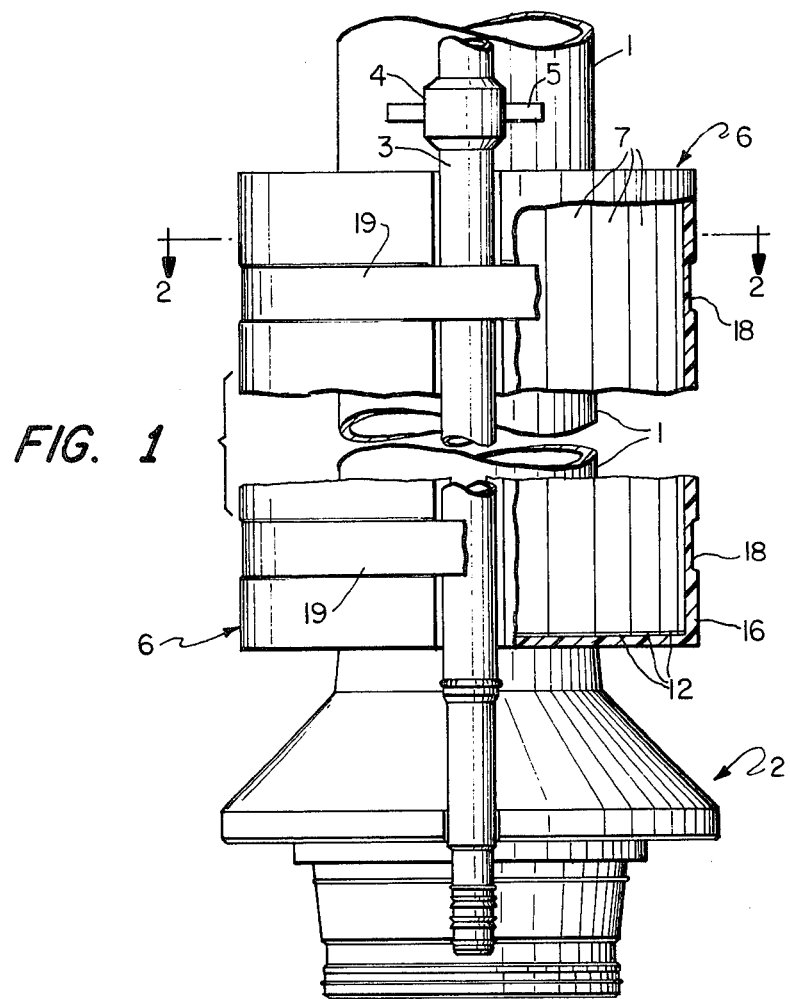
FIG. 1 is a side elevational view of a portion of a length of riser pipe equipped with buoyancy members according to one embodiment of the invention, parts being broken away for clarity of illustration.

In FIG. 1, the lower end of a length of riser pipe 1 is conventionally equipped with the male body assembly 2 of a conventional remotely operated connector. Kill and choke pipes 3, small in diameter compared to the riser pipe, extend beside the riser pipe locations which are diametrically opposed across the riser pipe, the kill and choke pipes being secured to the riser pipe by sleeves 4 and brackets 5. In this embodiment, each length of riser pipe 1 is equipped with two mutually identical buoyancy members 6.

Each buoyancy member comprises a plurality of hollow tubular elements 7, all elements 7 being identical. Each element 7 is an integral rigid straight piece having flat side walls 8, FIGS. 3 and 4, an arcuate inner wall 9, an arcuate outer wall 10 and two partitions 11 which extend longitudinally for the full length of element 7 and transversely for the full width between side walls 8. At each end, tubular element 7 is closed by an end cap 12.

The flat side walls 8 of each element 7 diverge from inner wall 9 toward outer wall 10 in such fashion that, if the planes of the two side walls are extended to intersect, any transverse cross-section through the two side walls 8 would define lines which constitute like portions of the equal sides of the isosceles triangle defined by extending the side wall planes. Inner wall 9 and outer wall 10 are concentric.

Figure 2:
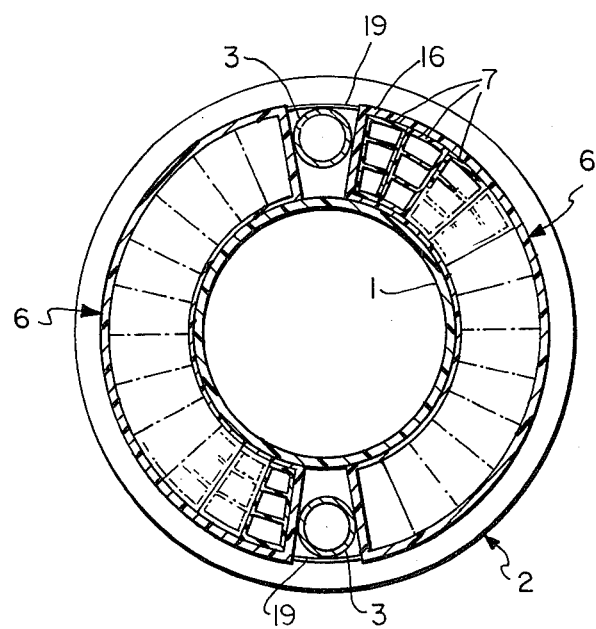
FIG. 2 is a transverse sectional view taken generally on line 2—2, FIG. 1.
Figure 4:
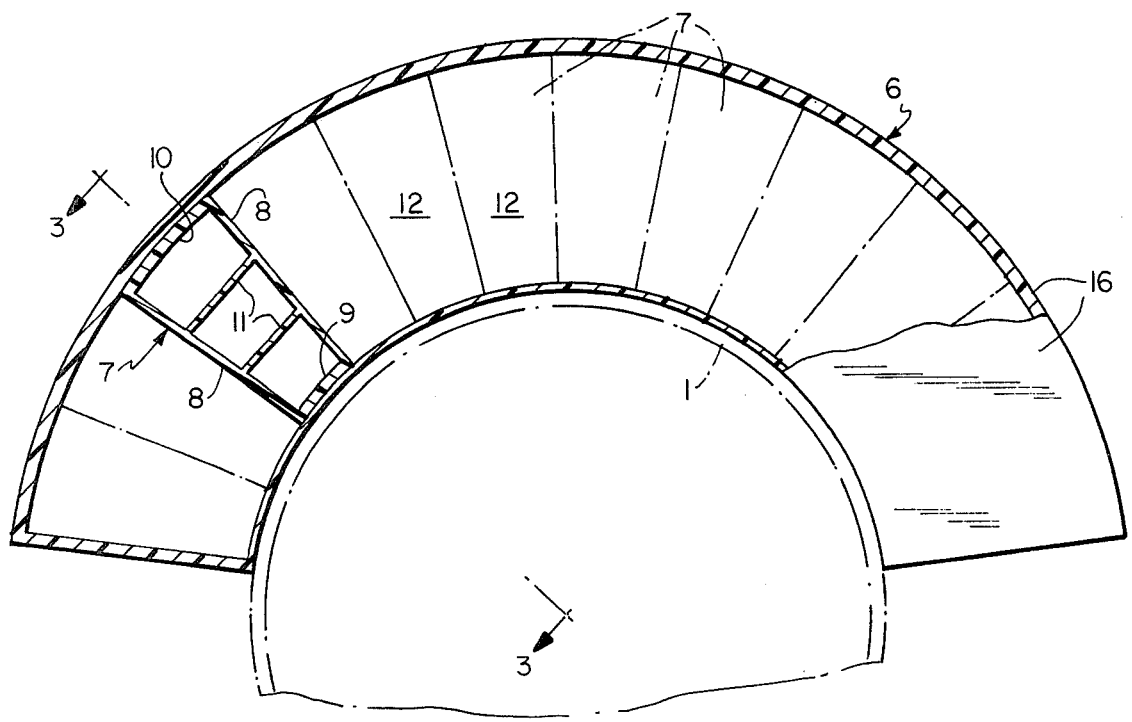
FIG. 4 is a transverse cross-sectional view taken on line 4—4, FIG. 3.
Figure 5:
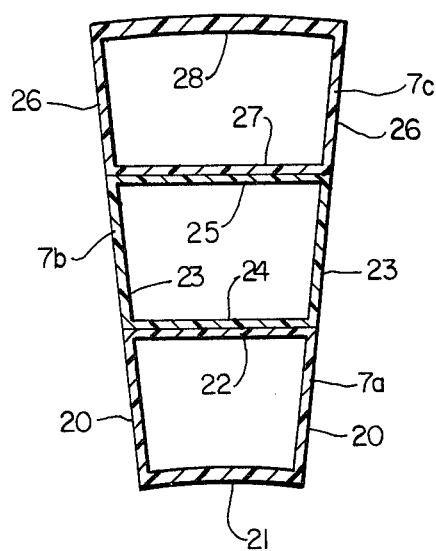
FIG. 5 is a transverse cross-sectional view of a tubular element according to another embodiment of the invention.

As seen in FIGS. 2 and 4, the tubular elements 7 of each buoyancy member 6 are arranged side-by-side, with the adjacent side walls 8 of each adjacent pair of elements 7 being in flush engagement and with the inner walls 9 lying in the same cylindrical plane and the outer walls 10 all lying in a common cylindrical plane. In the completed assembly seen in FIGS. 1 and 2, all of the side walls 8 lie in planes which are radial with respect to the riser pipe 1.

End caps 12 are integral flat pieces provided with straight grooves 13 to accommodate the ends of partitions 11, and arcuate notches 14, 15 to accommodate the ends of inner wall 9 and outer wall 10, respectively.

In each buoyancy member 6, the assembly of tubular elements 7 is completely enclosed by a liquid-tight shell 16 which extends completely over and lies in contact with the exposed surfaces of elements 7 and end caps 12. Save for the portion thereof covering walls 9, shell 16 is of substantial thickness, typically equal to or of the same order of magnitude as inner walls 9 and outer walls 10 of elements 7. Tension straps 17, FIG. 3, extend over all of the outer walls 10, transversely of the assembly of elements 7, and are completely covered by shell 16. In appropriate locations, typically one near each end of the buoyancy member and one at the midpoint thereof, the outer wall of shell 16 is provided with transverse outwardly opening grooves 18 to accommodate clamping bands 19, FIG. 1, which secure buoyancy members 6 to the riser pipe 1.

While tubular elements 7 can be formed of any suitable material, including light weight metal alloys, it is particularly advantageous from the standoint of weight, strength and cost to employ elements 7 in the form of pultrusions, i.e., shapes formed by pulling resin-impregnated strands through a shaping die and then through a heating chamber to provide a reenforced polymeric structure of accurately predetermined shape and dimensions, and high tensile strength, compression strength and modulus of elasticity. Employing glass reenforcing strands and polyester resins, elements 7 can be made in the form of pultrusions with tensile and compressive strengths of at least 25,000 lbs. per sq. in. and a modulus of elasticity of at least $1.5 \times 10^6$ lbs. per sq. in.

Water-tight shell 16 is advantageously in the form of a layer of polyester resin filled with chopped glass fibers.

Elements 7 are advantageously pre-coated, as by spraying, with the same polymeric material used to form shell 16, or a polymeric material compatible with the material of the shell, so that the elements 7 are adhered rigidly together in the final assembly. Before such pre-coating, end caps 12 are secured rigidly in place, as by use of a suitable adhesive.

Though buoyancy members 6 can be produced by any suitable method, it is particularly advantageous to employ the method disclosed in my aforementioned copending application.

Figure 3:
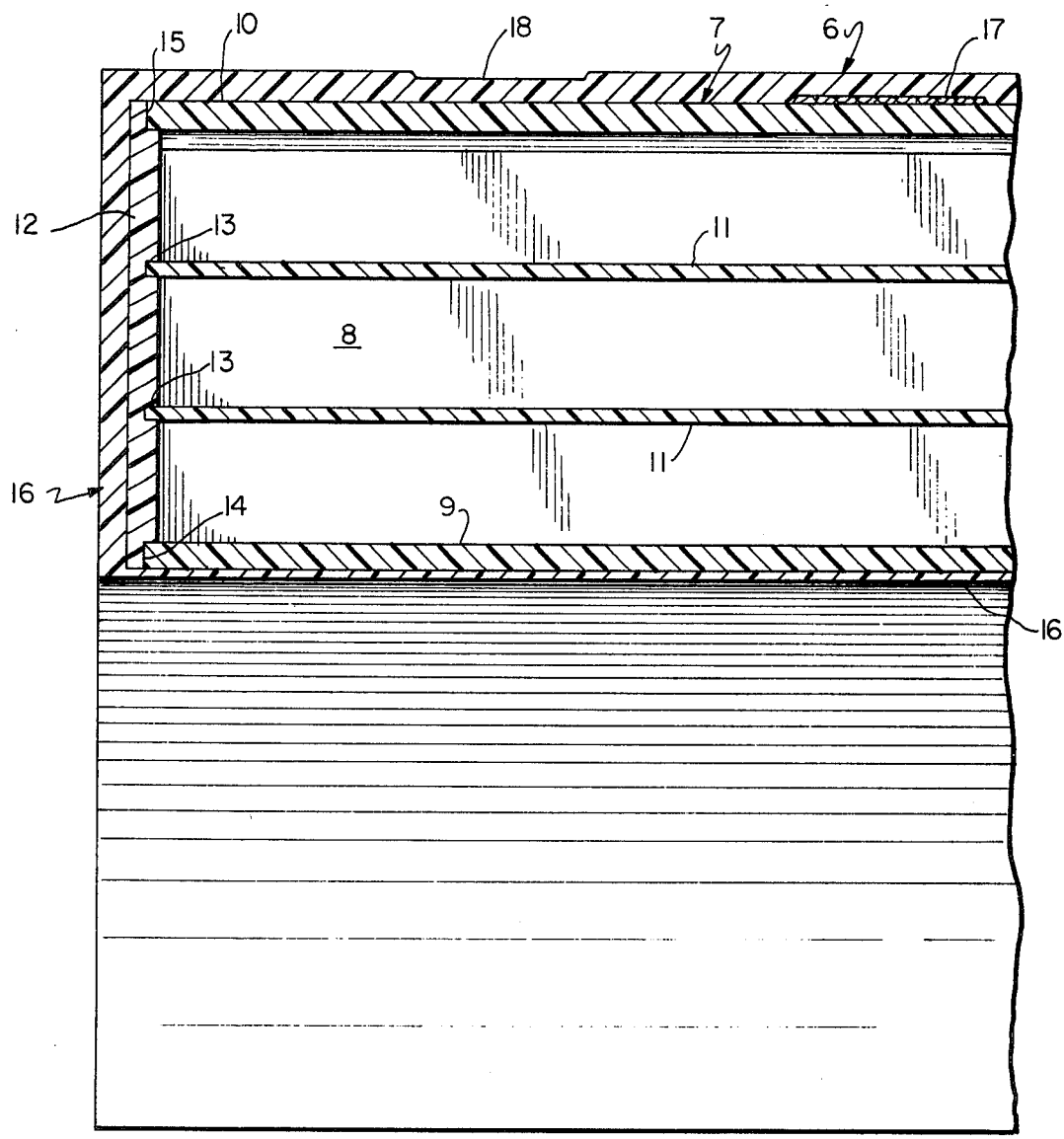
FIG. 3 is a longitudinal sectional view of one end portion of one of the buoyancy members of FIGS. 1 and 2, FIG. 3 being taken on line 3—3, FIG. 4.

Considering FIGS. 3 and 4, it will be noted that shell 16, being formed in place, conforms precisely to the assembly of tubular elements 8. Thus, the portion of shell 16 which extends over the inner end walls 9 of elements 8 presents a concave cylindrical surface, and this surface is designed to have essentially the same radius of curvature as does the outer surface of riser pipe 1. Accordingly, when the completed buoyancy members 6 are in place on the riser pipe, the inner surface of the buoyancy member is in flush engagement with the outer surface of the riser pipe. The portions of shell 16 which extend over the exposed side walls of the two elements 7 which are at the transverse sides of the groups of tubular elements present flat surfaces conforming to the side walls they cover, and these flat surfaces are spaced part angularly by less than 180° to provide spaces, between the two buoyancy members 6, to accommodate kill and choke pipes 3. The portion of shell 16 which extends over outer walls 10 of the group of members 7 presents a convex cylindrical surface, and the surface portions constituting the bottoms of grooves 18 are accordingly convex cylindrical surfaces to which the clamping bands 19 will conform without sharp bends.

In a typical application of this embodiment of the invention for use with a riser pipe having a 20 in. outer diameter, the length of buoyancy members 6 can be 180 in., with a number of pairs of buoyancy members used for each length of pipe. The dimension of tubular elements 7 radially of the assembly can be 8.38 in., the thickness of the outer layer of shell 16 can be 0.5 in. at grooves 17, and the thickness of the inner layer of the shell can be 0.12 in., so that the diameter of the assembly at the band clamp grooves is 38 in. Each buoyancy member 6 employs 12 tubular elements 7 in the form of glass strandpolyester pultrusions, with side walls 8 being 0.25 in. thick, outer wall 10 0.5 in. thick and partitions 11 0.25 in. thick. Typically, the two buoyancy members can present a net buoyancy of 1600 lbs., as compared to the 1650 lb. weight of the riser pipe.

Elements 7 and end caps 12 can be inspected and tested individually before being incorporated in the structure, thus affording optimum quality control. Similarly, the chopped glass-polyester resin for shell 16 is subject to quality control and its performance can be predetermined with accuracy. Accordingly, the strength characteristics and weight of buoyancy members 6 are more accurately predetermined than, for example, structures produced from syntactic foam. Further, made as hereinbefore described, the buoyancy members 6 have improved resistance to impact and are more economical to produce than devices of the prior art.

THE EMBODIMENT OF FIG. 5

In this embodiment, the tubular elements for the buoyancy members are made up of three tubes 7a, 7b and 7c. Tube 7a has flat side walls 20, an arcuate inner wall 21, and a flat outer wall 22. Tube 7b has flat side walls 23, a flat inner wall 24 and a flat outer wall 25. Tube 7c has flat side walls 26, a flat inner wall 27 and an arcuate outer wall 28. The side walls of all three tubes diverge outwardly at the same angle, and the shape and dimensions of the tubes are such that, when tube 7b is placed on tube 7a so that walls 22 and 24 are in flush engagement and tube 7c is placed on tube 7b so that walls 25 and 27 are in flush engagement, like side walls 20, 23 and 26 will be coplanar as shown. Walk 22, 24, 25 and 27 are each approximately one half as thick as the partitions 11, FIGS. 3 and 4. Tubes 7a–7c are pre-coated as hereinbefore described so that, in the completed assembly, wall 22 is adhered to wall 24, and wall 25 to wall 27.

It is to be noted that, in both embodiments described to illustrate the invention, the tubular elements 7 are in side-to-side contact, and that contact is over a substantial flat surface area presented by complementary wall portions of the adjacent tubular elements so that the assembly of tubular elements can withstand large hydrostatic forces without buckling.

What is claimed is:

1. In an underwater pipe assembly, such as a subsea riser, which requires buoyancy control, the combination of a length of pipe to be incorporated in the assembly;

at least two elongated buoyancy members each comprising a plurality of elongated rigid hollow tubular elements disposed side-by-side and a liquid-tight shell enclosing said tubular elements as a group, said tubular elements each being in the form of a continuous length having a uniform transverse cross-section and each comprising an inner wall, an outer wall, and two flat outwardly divergent side walls, the complementary side walls of adjacent pairs of said tubular elements being in face-to-face engagement, said shell having an inner wall which extends over said inner walls of all of said tubular elements, is transversely arcuate and embraces said pipe;

said divergent side walls of said tubular elements lying in respective planes which are radial with respect to said pipe; and securing means extending around the combination of said buoyancy members and said pipe and securing the buoyancy members to the pipe.

2. The combination defined in claim 1, wherein said inner walls of said tubular elements are transversely arcuate and lie in a common plane.

3. The combination defined in claim 1, and further comprising at least one length of tubing extending longitudinally along the outside of said pipe, adjacent longitudinal sides of two of said buoyancy members being spaced apart circumferentially of said pipe with said tubing being accommodated therebetween, said securing means comprising a plurality of clamping bands and said tubing being located inwardly of said clamping bands.

4. The combination defined in claim 2, wherein said outer walls of said tubular elements are transversely arcuate and lie in a common plane.

5. The combination defined in claim 1, wherein said tubular elements each comprise at least one integral reenforcing web extending transversely between said side walls and longitudinally for substantially the length of the tubular element.

6. The combination defined in claim 1, wherein said tubular elements are polymeric pultrusions.

7. The combination defined in claim 6, wherein said shell of each of said buoyancy members is a fiber-reenforced polymeric material and is in the form of a continuous layer extending over and adhered to the exposed outer surfaces of said tubular elements.

8. The combination defined in claim 7, wherein each of said buoyancy members further comprises a plurality of transverse tension straps extending over said outer walls of all of the tubular elements of the respective buoyancy member, said tension straps being embedded in the polymeric material of the shell of the buoyancy member.

9. The combination defined in claim 1, wherein said shell of each of said buoyancy members is of a fiber-reenforced polymeric material and is in the form of a continuous layer extending over and adhered to the exposed outer surfaces of said tubular elements.

10. In an underwater riser assembly, the combination of a length of riser pipe;

at least two elongated buoyancy members each having a transversely arcuate inner face embracing said riser pipe; and securing means extending around the combination of said buoyancy members and said riser pipe and securing the buoyancy members to the riser pipe;

each of said buoyancy members comprising a plurality of elongated rigid hollow tubular members disposed side-by-side and a liquid-tight shell enclosing said tubular elements as a group;

each of said tubular elements being in the form of a polymeric pultrusion and comprising a transversely arcuate inner wall, an outer wall, and two flat outwardly divergent side walls, complementary ones of said side walls of adjacent ones of said tubular elements being in mutual face-to-face engagement, said arcuate inner walls of said tubular elements lying in a common arcuate plane concentric with the riser pipe and said divergent side walls lying in respective planes which are radial with respect to the riser pipe;

each of said buoyancy members further comprising a plurality of tension members extending transversely across said outer walls of said tubular elements;

said liquid-tight shell being in the form of a layer of fiberreenforced polymeric material extending over and in contact with the exposed surfaces presented by the group of said tubular elements, said shell covering said tension members.

* * * * *